(12) United States Patent
Painsky

(10) Patent No.: US 8,805,648 B2
(45) Date of Patent: Aug. 12, 2014

(54) DATA FUSION IN HIGH COMPUTATIONAL LOAD ENVIRONMENTS

(75) Inventor: Amichai Painsky, Ra'anana (IL)

(73) Assignee: ATS Group (IP Holdings) Limited, Road Town, Tortola (VG)

( * ) Notice: Subject to any disclaimer, the term of this patent is extended or adjusted under 35 U.S.C. 154(b) by 380 days.

(21) Appl. No.: 13/253,742

(22) Filed: Oct. 5, 2011

(65) Prior Publication Data

US 2013/0091503 A1    Apr. 11, 2013

(51) Int. Cl.
*G06F 17/00* (2006.01)

(52) U.S. Cl.
USPC .......................................................... 702/187

(58) Field of Classification Search
USPC .......................................................... 702/187
See application file for complete search history.

(56) References Cited

U.S. PATENT DOCUMENTS

| | | | |
|---|---|---|---|
| 6,801,878 B1 | 10/2004 | Hintz et al. | |
| 7,917,332 B2 | 3/2011 | Waldock et al. | |
| 2007/0182623 A1 | 8/2007 | Zeng et al. | |
| 2010/0318641 A1 * | 12/2010 | Bullard et al. | 709/223 |

FOREIGN PATENT DOCUMENTS

WO    2013050984 A2    4/2013

OTHER PUBLICATIONS

Bertsekas, Dimitri, P., "The Auction Algorithm: A Distributed Relaxation Method for the Assignment Problem", Annals of Operations Research, Special Issue on Parallel Optimization, vol. 14, Issue 1, 1988, pp. 105-123.
Goldberg, Andrew V., et al., "Combinatorial Algorithms for the Generalized Circulation Problem", Mathematics of Operations Research, vol. 16, No. 02, May 1991, pp. 351-381.
Hall, David L., et al., "An Introduction to Multisensor Data Fusion", Proceedings of the IEEE, Invited Paper, vol. 85, No. 1, Jan. 1997, pp. 6-23.
Konstantinova, Pavlina, et al., "A Study of a Target Tracking Algorithm Using Global Nearest Neighbor Approach", International Conference on Computer Systems and Technologies—CompSysTech'2003, 2003, 6 pages.
Smith, Duncan, et al., "Approaches to Multisensor Data Fusion in Target Tracking: A Survey", IEEE Transactions on Knowledge and Data Engineering, vol. 18, No. 12, Dec. 2006, pp. 1696-1710.
International Search Report and Written Opinion for PCT Application No. PCT/IB12/55395, mailed Apr. 12, 2013, 12 pages.

* cited by examiner

*Primary Examiner* — Stephen Cherry
(74) *Attorney, Agent, or Firm* — Mark S. Cohen; Pearl Cohen Zedek Latzer Baratz LLP

(57) ABSTRACT

An input handler receives a plurality of observations from a plurality of sensors, the plurality of observations corresponding to a plurality of targets observed by the sensors. A correlation engine correlates, using a data fusion algorithm, observations of the plurality of observations with individual targets of the plurality of targets. A load monitor detects that a computational load associated with the correlating exceeds a threshold, and a bypass manager continues the correlating including bypassing at least a portion of the data fusion algorithm, in response to the detecting.

20 Claims, 6 Drawing Sheets

DATA FUSION IN HIGH COMPUTATIONAL LOAD ENVIRONMENTS

TECHNICAL FIELD

This description relates to data fusion for collected sensor data.

BACKGROUND

Surveillance systems and related item tracking technologies are designed to detect moving targets within one or more areas, and to thereby characterize the targets and/or their movements, or otherwise derive information related thereto. Thus, such surveillance and tracking systems may be used, for example, to track persons moving within a physical location (e.g., an airport, or a retail establishment), or may be used to monitor traffic moving within the streets of a city.

In these and many other example scenarios, a plurality of sensors may be deployed within and/or around a defined area(s), and the sensors may be operable to detect targets, movements, and other related data. Then, the data collected from the various sensors may be combined and utilized to determine desired information related to specific targets in the area. For example, in the above example scenarios, sensors deployed around an airport may provide sensor data with respect to persons and luggage within the airport, and the acquired data from the sensors may be processed in order to identify a particular person and/or activity which may be associated with a terrorist attack or other security breach at the airport. Similarly, sensors deployed at a retail establishment may be utilized to detect possible theft of merchandise, while traffic sensors may be utilized to determine traffic violators, or the existence and potential causes of traffic congestion.

In many such scenarios, sensor data provided by deployed sensors for processing may be unsynchronized, voluminous, and high variable. As a result, surveillance and tracking systems which receive such sensor data may experience correspondingly high, variable, and unpredictable computational loads.

Consequently, it is difficult for conventional surveillance and tracking systems to provide accurate, timely results in the presence of variable, high computational loads, in a manner that is practical and cost-effective.

SUMMARY

According to one general aspect, a computer system includes instructions recorded on a computer-readable medium and executable by at least one processor. The system includes an input handler configured to cause the at least one processor to receive a plurality of observations from a plurality of sensors, the plurality of observations corresponding to a plurality of targets observed by the sensors, and a correlation engine configured to cause the at least one processor to correlate, using a data fusion algorithm, observations of the plurality of observations with individual targets of the plurality of targets. The system includes a load monitor configured to cause the at least one processor to detect that a computational load associated with the correlating exceeds a threshold, and a bypass manager configured to cause the at least one processor to continue the correlating including bypassing at least a portion of the data fusion algorithm, in response to the detecting.

According to another general aspect, a computer-implemented method includes receiving a plurality of observations from a plurality of sensors, the plurality of observations corresponding to a plurality of targets observed by the sensors, and correlating, using a data fusion algorithm, observations of the plurality of observations with individual targets of the plurality of targets. The method further includes detecting that a computational load associated with the correlating exceeds a threshold, and continuing the correlating including bypassing at least a portion of the data fusion algorithm, in response to the detecting.

According to another general aspect, a computer program product is tangibly embodied on a computer-readable medium and includes instructions that, when executed, are configured to receive a plurality of observations from a plurality of sensors, the plurality of observations corresponding to a plurality of targets observed by the sensors, and correlate, using a data fusion algorithm, observations of the plurality of observations with individual targets of the plurality of targets. The instructions, when executed, are further configured to detect that a computational load associated with the correlating exceeds a threshold, and continue the correlating including bypassing at least a portion of the data fusion algorithm, in response to the detecting.

The details of one or more implementations are set forth in the accompanying drawings and the description below. Other features will be apparent from the description and drawings, and from the claims.

DETAILED DESCRIPTION

Figure 1:
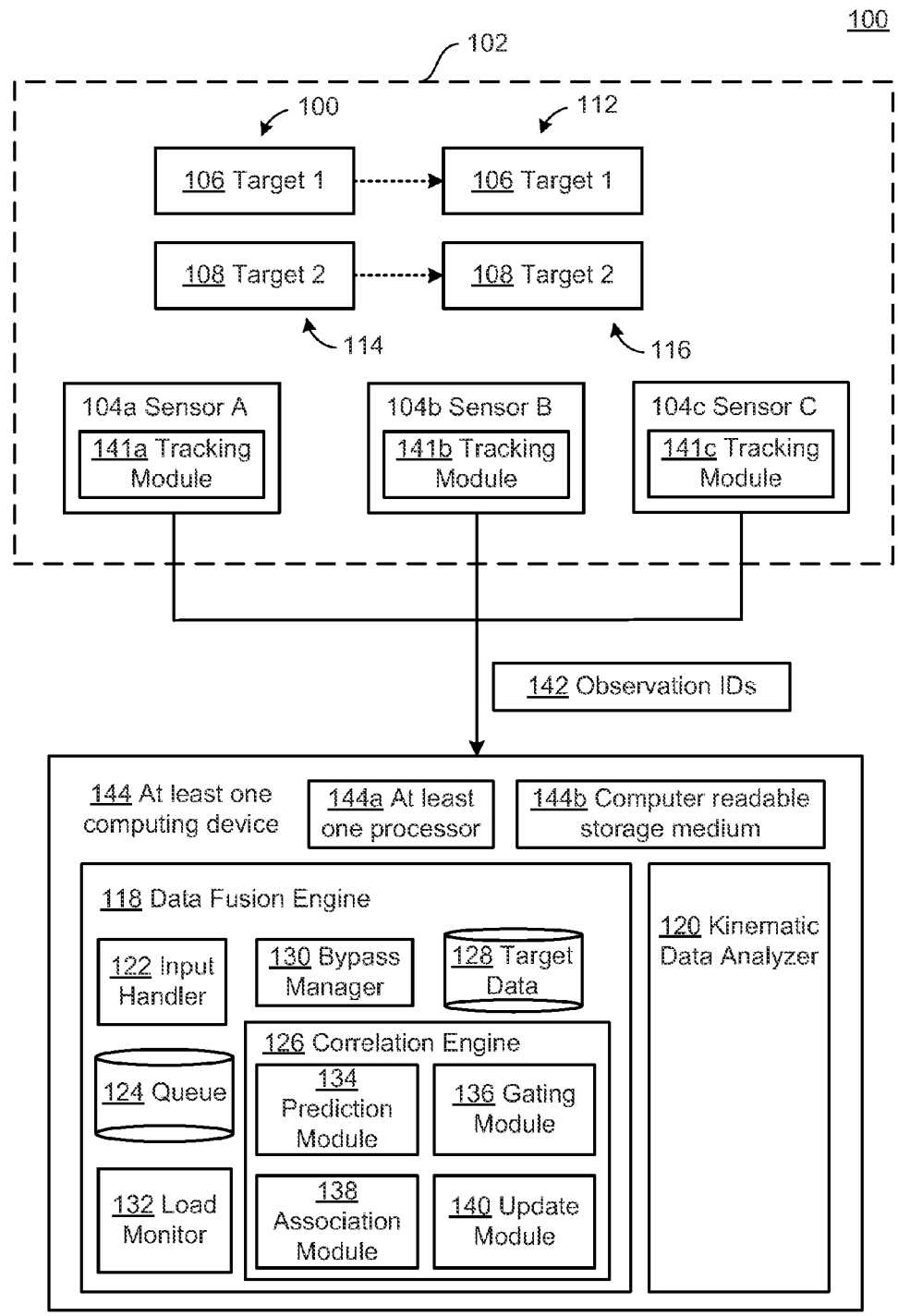
FIG. 1 is a block diagram of a system for performing item tracking in high computational load environments.

FIG. 1 is a block diagram of a system 100 for performing item tracking in high computational load environments. More specifically, the system 100 is configured to operate in environments in which the computational load is variable, and includes computational loads which exceed a standard ability of computational resources of the system 100 to provide accurate, complete, and timely tracking updates. More specifically, in the presence of such high computational loads, the system 100 is configured to adapt computational techniques during the duration of the occurrences of the high computational loads, so as to maintain acceptable characteristics of item tracking output, until such time as the computational load returns to normal levels.

Consequently, the system 100 is capable, during periods of low or otherwise acceptable computational loads, of providing accurate data and associated analysis thereof, in a timely manner. On the other hand, during times of high computational loads, the system 100 does not require construction of a surveillance and tracking system with sufficient computing resources to handle a highest-anticipated computational load, which, in practice may be infeasible, undesirable, or impossible to do, particularly given that the variable nature of the computational load implies that deployment of resources which are sufficient to handle the highest-anticipated computational load may be inefficient (e.g., since a significant portion of the computational resources may be idle whenever the computational load is in a low-to-normal range).

In the example of FIG. 1, an area 102 is illustrated as including a plurality of sensors, illustrated as sensors 104a, 104b, 104c. As may be appreciated, the area 102 may represent virtually any example of one or more physical locations in which sensors 104a-104c may be deployed. For example, as referenced above, the area 102 may represent an airport, a building, or a city. Thus, the area 102 may be anywhere on land, in the air, on or under the water, or any physical location in which, or around which, the sensors 104a-104c may be deployed.

Consequently, it may be appreciated the sensors 104a-104c may represent virtually any number and/or type of sensors which may be configured to detect or determine kinematic data associated with a plurality of targets 106, 108. That is, in the simplified example of FIG. 1, targets 106, 108 may be understood to represent a potentially large plurality of targets which may be mobile, or otherwise moveable or moving, within or through the area 102. Thus, the sensors 104a-104c may be understood to represent virtually any number and/or type of sensor which is operable to detect or determine, either directly or indirectly, such motions and related data associated with each of the plurality of targets 106, 108.

For the sake of providing a few representative examples, the sensors 104a-104c may include, e.g., cameras, video cameras, photo detectors, microphones, sonar systems or other acoustically-based sensors, sensors which detect vibration, temperature, or pressure, or virtually any sensor which is operable to detect or determine physical phenomena associated with location and/or movements of the plurality of targets 106, 108. Thus, the sensors 104a-104c may be selected and deployed based on, among other factors, characteristics of the area 102 and/or the plurality of targets 106, 108. For example, the targets 106, 108 may include persons, vehicles, projectiles, packages, animals, or virtually any item which may move within and/or through the relevant area 102. Consequently, as referenced above, the sensors 104a-104c may be selected, configured, and deployed in a manner consistent with characteristics of the area 102, the targets 106, 108, and the type and extent of related information that is desired to be obtained.

Thus, as referenced above, it may be appreciated that the area 102, the sensors 104a-104c, and the targets 106, 108 may represent virtually any scenario in which a plurality of deployed sensors are configured and operable to track or otherwise detect targets and information related thereto with respect to a relevant area in which such sensors and targets are at least temporarily physically present. Relevant example scenarios may thus include any of the various examples described herein, or variations or combinations thereof, as well as many other well-known examples, which are too numerous to mention here in detail.

In any and all such example scenarios, as also referenced above, the various targets, e.g., the target 106 and the target 108, may move or be moved within or through the area 102. For example, the targets 106, 108 may move independently, e.g., such as when the targets 106, 108 include persons, animals, automobiles, or other self-powered targets. In other example scenarios, the targets 106, 108 may experience movement due to external forces, e.g., such as when the targets 106, 108 include packages, pallets, or other items which may be moved by humans, machines, or other external forces. Thus, the targets 106, 108 may experience changes in speed, acceleration, direction, or other motion-related aspects. Consequently, there may be varying levels of difficulties in predicting or estimating future movements of the targets 106, 108, which may vary widely from system to system, and/or from time to time.

In the simplified example of FIG. 1, the target 106 is illustrated as moving from a position 110 to a position 112, while the target 108 is illustrated as moving from a position 114 to a position 116. Of course, it may be appreciated from the above description that such movements are intended to represent and include any of the types of movements, or characteristics thereof, which may be exhibited by targets in the various example scenarios referenced above.

Nonetheless, even in the simplified example of FIG. 1, it may be observed that such target movements may be associated with corresponding difficulties experienced by one or more of the sensors 104a-104c in performing their respective functions of tracking the targets 106, 108. For example, it may occur that the movements of the targets 106, 108 may cause the targets 106, 108 to move to an edge of, or outside of, an operational range of the sensor 104a, but may, at the same time, move the targets 106, 108 within range of the sensor 104c.

Moreover, as referenced above, it may occur that the various sensors 104a-104c may vary in their respective operational ranges with respect to one another, or with respect to various other factors. In many cases, as also described herein, some of the sensors 104a-104c may be of a different type than other of the sensors 104a-104c, so that, for example, the sensor 104c may be of a type that is better suited to accurately tracking movement of a particular type of target 106, 108, as compared to the sensor 104a, which may be of another type.

Still further, the sensors 104a-104c may be entirely or partially unsynchronized with respect to one another, and/or may otherwise operate independently of one another. For example, different sensors may detect the same event, (e.g., the movement of the target 108 from the position 114 to the position 116) yet may report or output data related to such an event at different times. Similarly, but conversely, different sensors may report different events at the same time. Consequently, for these and other reasons, it may be difficult to obtain desired levels of accuracy with respect to detecting the targets 106, 108 and movements thereof using a single sensor of the sensors 104a-104c.

Consequently, a data fusion engine 118 is illustrated which may be configured to receive data from the sensors 104a-104c, and to thereafter correlate subsets of the various reported observations received from two or more of the sensors 104a-104c and individual target of the plurality of targets within the area 102. In other words, by using the data fusion engine 118, different features, positions, and other characteristics of the various sensors 104a-104c may be leveraged to provide a combined representation of the targets 106, 108 which is more accurate than could be obtained by using any single one of the sensors 104a-104c. Thus, the data fusion engine 118 may be used to provide a unified target picture from the various observations reported by the plurality of sensors 104a-104c, thereby simplifying the otherwise complex view generated by the multiple sensors 104a-104c covering the (same) area 102, and thereby reducing the view complexity by combing multiple sensor detections or observations into an identification of a single, specified target.

Generally speaking, the data fusion engine 118 may be understood to receive the various unsynchronized observations, and to thereafter perform multiple target tracking (MTT) in order to estimate the kinematical data of the various targets. In such an observation-to-target data fusion approach, a plurality of fusion cycles may be executed, in which a presently-incoming set of sensor observations are each associated with previously-identified targets currently existing in the data fusion engine 118, which themselves were previously associated with previous observations during a preceding fusion cycle.

Through the use of such data fusion techniques, and related techniques, kinematic data associated with the targets 106, 108 may be accumulated, so that a kinematic data analyzer 120 may thereafter be utilized to analyze the collected data and thereby provide useful information to an operator of the system 100. For example, the kinematic data analyzer 120 may report detected or derived information regarding a velocity, acceleration, position, or other characteristic, or may provide identify information (e.g., a name) of a person or other target. In more specific examples, the kinematic data analyzer 120 may infer or deduce relevant information, such as, e.g., a potential theft or other security breach.

Although specific examples are provided below for the sake of explanation of the system 100 of FIG. 1 and related systems, it will be appreciated that such data fusion techniques, by themselves, are generally well known. For example, such techniques may include sequential estimation techniques, such as Kalman filters, and/or data fusion techniques using Bayesian inference, weighted decision methods, Dempster-Shafer's method, or variations or combinations thereof. In the context of these and other data fusion techniques, each of the fusion cycles described above generally requires a finite and non-deterministic processing time, which may be influenced by many factors. As a result, in certain environments, such data fusion techniques may experience delays and other causes of error, which may propagate to future data fusion operations, and/or to any related post-fusion processing.

Specifically, for example, high computational load environments may exist, such as, for example, when a large number of targets are present within the area 102, and/or when the targets and the area 102 move or accelerate quickly or in ways that are difficult to predict. In these and other scenarios, of course, the resulting computational load may be defined as being high, only relevant to existing or available computational resources. In such scenarios, data fusion operations may be slow, delayed, or may provide inaccurate updates with respect to one or more targets within the area 102. As a result, an operator may be unaware of an existence, identity, or movement of a particular target, or may mistake an identity of one target with that of another target, or may otherwise be provided with delayed or inaccurate results.

In the example of FIG. 1, however, the data fusion engine 118 is operable to dynamically adapt to current and/or dynamically changing load environments. In particular, as described in detail below, the data fusion engine 118 may be configured to dynamically alter a fusion method being implemented, so as to thereby provide timely target updates with little or no loss of received observations, thereby preserving functionalities of the data fusion engine 118 even in the presence of high computational loads. Moreover, if and when a computational load experienced by the data fusion engine 118 becomes lower, the data fusion engine 118 may again dynamically adapt the fusion method being implemented, in a manner which is self-healing with respect to any intervening loss of accuracy while the computational load was high. In this way, the data fusion engine 118 may thereby optimize data fusion operations even in the presence of computational loads which vary over time from relatively high to relatively low, and even when such variations in computational load occur in a manner which is difficult or impossible to predict.

For example, in the example of FIG. 1, the data fusion engine 118 is illustrated as including an input handler 122, which may be configured to receive observations from the sensors 104a-104c, and which may further be configured to store the received observations within a queue 124. Then, during each fusion cycle, a correlation engine 126 may be configured to retrieve observations from the queue 124, and may further be configured to implement data fusion techniques to thereby correlate the observations with individual targets, e.g., with either the target 106 or the target 108. Subsequently, the correlation results may be stored as (and/or used to update) target data 128, which may be utilized by the kinematic data analyzer 120, as described herein.

Thus, the data fusion engine 118 is configured to convert received observations into the target data 128 in a time-ordered, first-in, first-out manner. If the observations are received and stored in the queue 124 at a rate which is at or below a processing rate of the correlation engine 126, and if a capacity of the queue 124 is not reached or exceeded, and if, in general, available computational resources of the data fusion engine 118 are not stressed or exceeded, then the data fusion engine 118 may proceed with converting received observations into target data 128 in a timely and accurate manner.

As referenced above, however, in high computational load environments and/or high target load environments, it may occur that available computational resources of the data fusion engine 118 are, in fact, stressed or exceeded. For example, in scenarios in which a large number of targets are detected within the area 102, it may occur that a correspondingly large number of observations are received by the input handler 122. In such cases, it may occur that a capacity of the queue 124 is exceeded, and/or that a rate of arrival of the observations may meet or exceed a processing rate of the correlation engine 126.

As referenced above, in these and similar scenarios, the data fusion engine 118 may be configured to dynamically adapt associated/current fusion operations, e.g., the correlating operations of the correlation engine 126. In so doing, as described below in detail, the data fusion engine 118 is configured to thereby provide timely target updates of the target data 128, with little or no loss of received observations at the queue 124, and thereby preserving high levels of system function needed in the presence of high load environments. Thus, as described below, the data fusion engine 118 may be configured, even in high load environments, to continue to provide timely updates of the target data 128, while not requiring allocation of many or any additional computing resources.

Specifically, a bypass manager 130 may be configured to cause the correlation engine 126 to bypass or otherwise modify or adapt one or more aspects of the correlating operations of the correlation engine 126, so as to thereby continue the correlating operations using fewer computational resources. In this way, available computational resources may continue to be sufficient to support the thus-modified correlating operations of the correlation engine 126.

As a result, the correlation engine 126 may continue to update the target data 128 in a relatively timely and accurate fashion, even in high load environments. That is, for example, even if the bypass operations managed by the bypass manager 130 result in a temporary reduction in accuracy in updating the target data 128, the target data 128 may nonetheless be updated in a more timely and accurate manner than would occur in the absence of the bypass manager 130, as described in detail herein. As a result, the data fusion engine 118 may provide updates of the target data 128 in the presence of variable, unpredictable, high load environments, and without requiring the allocation of many or any additional computational resources in order to do so.

As just referenced, bypass operations of the bypass manager 130 may modify the correlating operations of the correlation engine 126 in a manner that reduces computational resources required by the correlation engine 126. In so doing, as also just referenced, the bypass manager 130 may cause a (temporary) reduction in accuracy of updates of the target data 128, and/or may otherwise introduce a relative degree of error not present in the absence of bypass operations of the bypass manager 130. As described herein, however, the correlation engine 126 is configured to heal any such inaccuracies (i.e., to correctly identify targets) once the high load environment is no longer present.

Nonetheless, in order to minimize the introduction of such relative losses in accuracy and/or relative increases in error rates, and to ensure that bypass operations of the bypass manager 130 result in an overall net increase in timeliness and accuracy of the correlation engine 126 relative to conventional correlation engines of conventional data fusion engines, the data fusion engine 118 may be configured to implement the bypass manager 130 only moderately, e.g., may utilize the bypass manager 130 only in the presence of high load environments, while not using the bypass manager 130 when such high load environments are not present.

Specifically, in the example of FIG. 1, a load monitor 132 of the data fusion engine 118 may be configured to monitor a current load or level of the queue 124. Then, as described in detail below, e.g., with respect to FIG. 3, the load monitor 132 may detect or infer the presence of a high computational load or high target load environment when a level of the queue 124 exceeds a predefined threshold. Similarly, but conversely, the load monitor 132 may be configured to detect or infer the absence of a high load environment when the level of the queue 124 is below a second, lower threshold. Thus, by determining a presence or absence of a high load environment at any given point in time, the load monitor 132 may be configured to invoke the bypass manager 130 only in the presence of high load environments, and to deactivate the bypass manager 130 in the absence of such high load environments. In this way, as referenced above, and as described in detail herein, the data fusion engine 118 may be configured to dynamically adapt and adjust operations of the correlation engine 126, so as to maximize a timeliness and accuracy of updates of the target data 128, while optimizing the use of available computational resources in doing so.

In the context of FIG. 1, as referenced above, the correlation engine 126 may be configured to execute using a variety of correlation techniques. That is, for example, an observation-to-target multiple target tracking (MTT) engine may be designed using one of a number of different approaches. Such approaches may include, for example, the nearest neighbor (NN), the global nearest neighbor (GNN), or the multiple hypothesis testing (MHT) approach(es), or other known approaches, or combinations thereof.

In the specific example of FIG. 1, and in a number of the following examples described below, e.g., with respect to FIGS. 5A, 5B and 6, the correlation engine 126 is implemented using a global nearest neighbor (GNN) technique. However, it should be apparent from the above that the above-referenced techniques, or other techniques, may be implemented by the correlation engine 126 of the system 100.

In the example of FIG. 1, as described in more detail below with respect to FIGS. 5A, 5B and 6, the correlation engine 126 may include a prediction module 134 which may be configured to predict a next or subsequent position of a given target, given all known and/or current information regarding that target. For example, with respect to the target 106, the prediction module 134 may predict that the target 106 which is currently at the position 110 may move next to the position 112, as illustrated in the example of FIG. 1.

For example, in a simplified example, it may occur that the target 106 moves forward in a straight line at an approximate rate of one foot per second. Therefore, the prediction module 134 may predict that in an upcoming second, the target 106 may move forward in a straight line for a distance of one additional foot, thereby arriving at the position 112. Depending on a variety of generally well-known factors, including, e.g., a length, consistency, or other aspect(s) of previous movements of the target 106, the prediction module 134 may have varying levels of confidence in predicting the next or subsequent location of the target 106 at the position 112.

Nonetheless, even in scenarios where the prediction module 134 has a theoretically high confidence in the accuracy of its prediction, it may occur that the target 106 moves in a manner, e.g., to a position, that is not predicted by the prediction module 134. More generally, it may be appreciated that a plurality of targets within the area 102 may, at any given time, be in the process of undergoing individual movements, so that the prediction module 134 may make corresponding movement predictions for each such target.

Subsequently, a gating module 136 and an association module 138 may proceed to attempt to verify, or, if necessary, modify the predictions of the prediction module 134, so as to thereby accurately associate, or correlate, observations received at the input handler 122 with actual, correct identities of the individual targets. In this way, an update module 140 may receive the resulting correlations between observations and targets, and may therefore update the target data 128 accordingly.

As described below, the gating module 136 may be operated as a pre-processing module, designed to reduce a complexity of operations of the association module 138. For example, the gating module 136 may be utilized to define a distance between a received observation and a predicted target, beyond which the predicted target will not be considered for association with the observation. In other words, a pre-defined distance threshold may be designated, such that observations beyond the threshold are dismissed from consideration for possible association with the relevant target in a predicted position thereof. Thus, in this way, the association module 138 may be provided with a relatively reduced number of observations which may possibly be associated with a predicted target.

Meanwhile, as also described in detail below, the association module 138 may be configured to receive predicted targets and observations, and to thereafter generate pairs of predicted targets and corresponding observations. The predicted pairs may then be utilized to associate individual observations and targets. For example, the association may be calculated such that a global price of association is minimized, where the price may be defined as a distance measure between a predicted target and its associated observation.

By utilizing the modules 134-140, the correlation engine 126 may provide timely, accurate updates to the target data 128. However, some or many of the operations of the modules 134-140 may be computationally intensive. In particular, operations of the association module 138 may consume a relatively large amount or proportion of computational resources. Consequently, as described in detail herein, high load environments which result in high rates of update of the queue 124 and/or large numbers of updates of the queue 124 may strain or exceed an ability of the available computational resources to support operations of the modules 134-140.

In such scenarios, as described, the load monitor 132, by monitoring the queue 124, may inform the bypass manager 130 of the existence of a high load environment, so that the bypass manager 130 may begin bypass operations with respect to the correlation engine 126. For example, in the example of FIG. 1, the bypass manager 130 may implement bypass operations including reducing or at least temporarily eliminating certain operations of the association module 138.

Specifically, in the example of FIG. 1, as shown, the sensors 104a-104c each may include corresponding tracking modules 141a-141c. Thus, as shown, the sensors 104a-104c may be provided with embedded tracking abilities which allow the sensors to generate observations associated with corresponding, unique observation IDs 142. In other words, the sensors 104a-104c each may determine raw sensor data (plots), and the corresponding tracking modules 141a-141c may thereafter be used to assign unique observation IDs for observations corresponding to the raw sensor data. The observation IDs 142 may be used by the relevant sensors to track and distinguish between observations over time, so that, in the context of a specific sensor, a specific observation will maintain its individual, unique ID number, as long as the relevant sensor's tracking module believes that the observation in question is the same observation from previous cycles.

Thus, the tracking modules 140a-140c represent an internal Multiple Target Tracking (MTT) performed by each sensor as a means of maintaining its own observation ID numbers. Such techniques, during normal operation, provide an additional layer of MTT processing which enhances operations of the data fusion engine 118.

In operation, the bypass manager 130 may cause the correlation engine 126 to leverage the available observation IDs 142 in order to execute bypass operations, e.g., with respect to the association module 138. Specifically, as described herein, during normal operations (i.e., operations not conducted in high load environments), the update module 140 may be configured to utilize associations provided by the association module 138 to update the target data using a current observation set, such that each target is updated by not more than a single observation. In addition to updating the target, including any relevant or desired kinematic data, the target data 128 may be updated to include the observation ID number associated with the observation used to update the target in question. Therefore, each target in the target data 128 holds a list of observation IDs, where each observation ID number corresponds to the latest, most recent observation used to update the target and provided by the relevant sensor which provides the observation in question.

Bypass operations for bypassing one or both of the operations of the gating module 136 and the association module 138 may be executed in future fusion cycles, by temporarily requiring that every observation ID that was previously associated with the target in the past be continued to be associated with the same target in the future, i.e., each such observation ID may be used to update the target in question.

Thus, in the context of bypass operations implemented by the bypass manager 130, some or all of the functionalities of the gating module 136 and/or the association module 138 may be bypassed when in the presence of high load environments. Specifically, using the above-described approach, for example, the functionalities of the gating module 136 and the association module 138 may be executed the first time that a sensor introduces its first observation set, and afterwards only if new observation IDs are received (or if targets and systems were deleted).

Such approaches may be utilized to dramatically decrease a computational load of the correlation engine 126, while ensuring timely updates of the target data 128. Nonetheless, it is possible or probable that such approaches may introduce at least a temporary reduction in accuracy of the target updates (e.g., updating the target 108 as being at the position 112, when in fact the target 106 is located at the position 112 at a given point in time, or similar errors in accuracy). For example, if the first association was incorrect, due, for example, to a high density of targets or sophisticated maneuvers of the targets, then subsequent associations also are likely to be incorrect.

Therefore, the correlation engine 126 may be enabled to continue observation-to-target tracking until if and when bypass operations cease, whereupon full functionalities of the gating module 136 and/or the association module 138 may be restored. At such time, it may be appreciated that the correlation engine 126 will again perform independent observation-to-target correlations, e.g., which do not rely on the observations IDs 142, and which therefore result in accurate updates of the target data 128 going forward, even if any temporary inaccuracies were introduced during the bypassing operations (i.e., will cure any such inaccuracies over time).

Thus, as described, bypassing functionalities of the gating module 136 and the association module 138 in the context of high load environments may be used to void queue overflow of the queue 124 that may be caused by relatively long processing times of the correlation engine 126, or by other factors as described herein, without any long-term loss in accuracy. In this way, bypassing functionalities of the gating module 136 and the association module 138 for relatively short periods of time, e.g., in the presence of high load environments, may enable the correlation engine 126 to provide on-time fusion results (i.e., timely updates of the target data 128), without ignoring or neglecting any observations within the queue 124, without experiencing delays in target updates, missed or dropped target updates, or sluggishness of the system 100 as a whole.

In the example of FIG. 1, the data fusion engine 118 and the kinematic data analyzer 120 are illustrated as being implemented through the use of at least one computing device 144, including at least one processor 144a and computer readable storage medium 144b. For example, different parts of the data fusion engine 118 and/or the kinematic data analyzer 120 may be implemented using two or more computing devices in communication with one another over a computer network. Additionally, or alternatively, the data fusion engine 118 and/or the kinematic data analyzer 120 may be executed using a plurality of processors implementing parallel processing techniques. The computer readable storage medium 144b may represent virtually any computer memory which maybe used to store instructions executable by the at least one processor 144A for implementation of the data fusion engine 118 and/or the kinematic data analyzer 120 therewith.

Moreover, although the data fusion engine 118 is illustrated as including a number of separate, individual components, it may be appreciated that the illustrated example of the data fusion engine 118 is intended merely as a non-limiting example, and that other embodiments may be implemented, as well. For example, any two or more of the modules 122-140 of the data fusion engine 118 may be implemented as a single module, while any individual module may conversely be implemented as two or more separate modules. Moreover, additional or alternative modules may be included, as well, as would be apparent to one of skill in the art.

Figure 2:
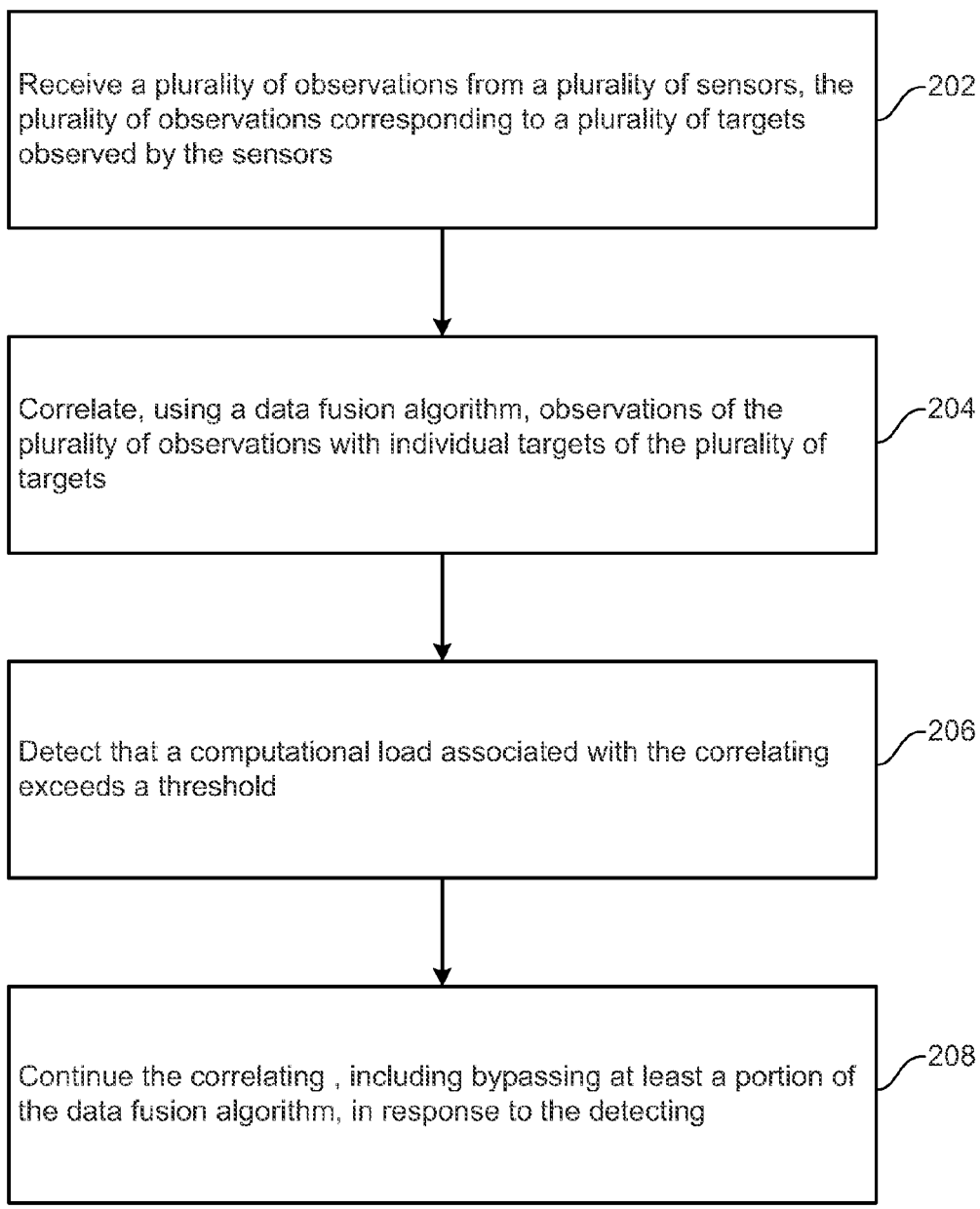
FIG. 2 is a flowchart illustrating example operations of the system of FIG. 1.

FIG. 2 is a flowchart 200 illustrating example operations of the system 100 of FIG. 1. In the example of FIG. 2, operations 202-208 are illustrated as separate, sequential operations. However, it may be appreciated that the flowchart 200 represents a non-limiting example of operations of the system 100 of FIG. 1. Thus, for example, embodiments of the system 100 may be implemented using additional or alternative operations, not specifically illustrated in the example of FIG. 2. Moreover, it may be appreciated that the operations 202-208 may be implemented in a manner different than that shown, e.g., two or more of the operations 202-208 may be implemented in a partially or completely overlapping or parallel manner, and/or operations may be performed in a nested, looped or iterative manner.

In the example of FIG. 2, a plurality of observations may be received from a plurality of sensors, the plurality of observations corresponding to a plurality of targets observed by the sensors (202). For example, the input handler 122 may be configured to receive observations from the sensors 104a-104c, the observations corresponding to the targets 106, 108.

Using a data fusion algorithm, observations of the plurality of observations may be correlated with individual targets of the plurality of targets (204). For example, the correlation engine 126 may be configured to retrieve observation sets from the queue 124, and to associate the retrieved observations with specific targets, to thereby update the target data 128 accordingly.

A computational load associated with the correlating may be detected as exceeding a threshold (206). For example, the load monitor 132 may be configured to detect that a content of the queue 124 exceeds a predefined queue threshold.

The correlating may then be continued, including bypassing at least a portion of the data fusion algorithm, in response to the detecting (208). For example, the bypass manager 130 may be configured to cause the correlation engine 126 to continue correlating operations, including bypassing functionalities of one or both of the gating module 136 and/or the association module 138. For example, as referenced above and described in more detail below, the bypass manager 130 may cause the correlation engine 126 to rely on the observation IDs 142 assigned by the various tracking modules 140a-141c of the sensors 104a-104c, rather than executing a full implementation of the gating module 136 and/or the association module 138.

Although not shown specifically in the example of FIG. 2, it may be appreciated that future operations of the data fusion engine 118 may include detecting that a computational load associated with the correlating operations of the correlation engine 126 are at or below a second threshold, the second threshold being associated with an absence of a high computational load. For example, as described herein, the load monitor 132 may detect that a content of the queue 124 is at or below a lower threshold, beneath which a high computational load is considered not to exist. At such time, the load monitor 132 may notify the bypass manager 130 of the current absence of a high computational load environment, whereupon the bypass manager 130 may cease bypass operations implemented with respect to the correlation engine 126.

Figure 3:
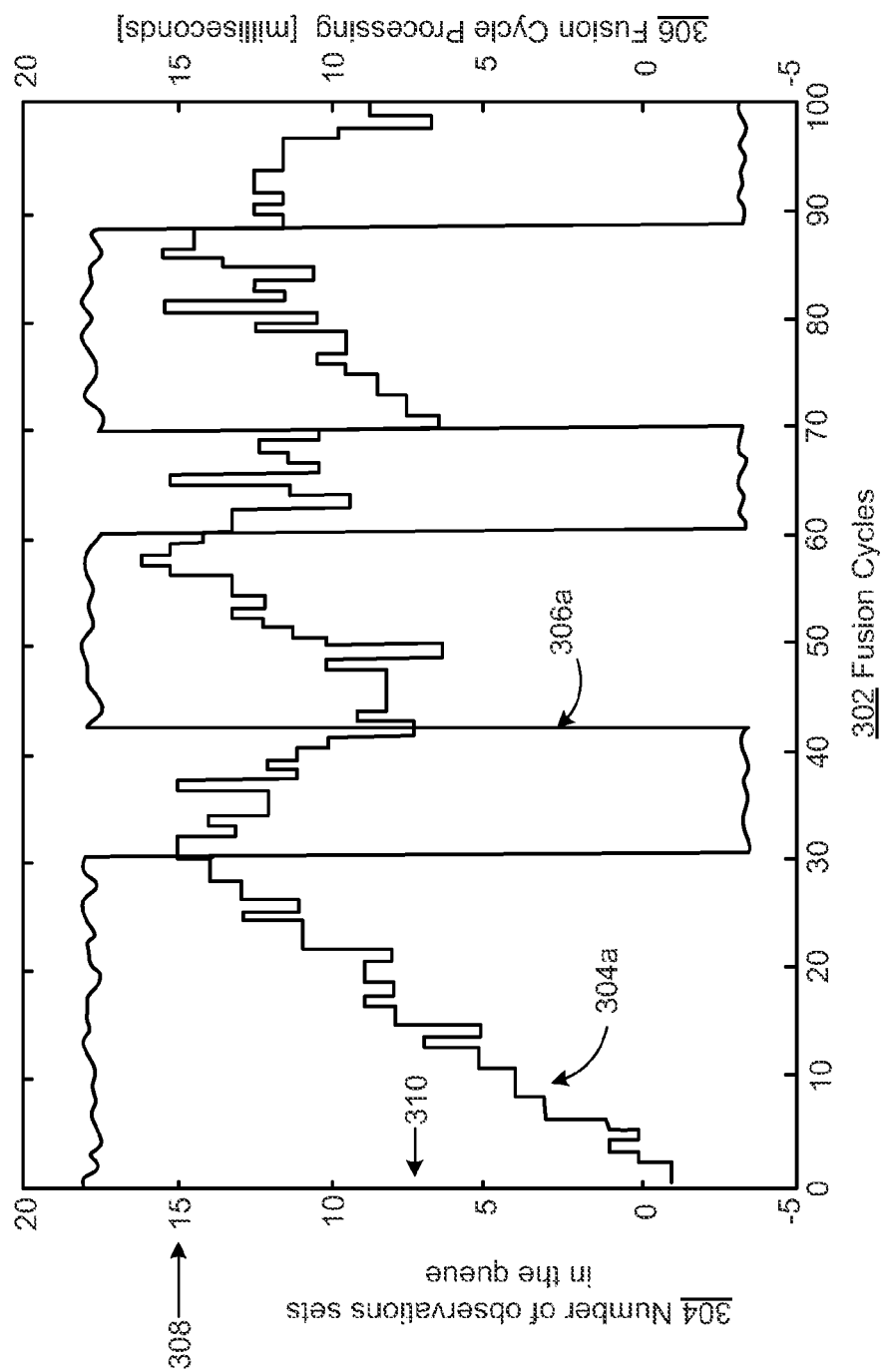
FIG. 3 is a timing diagram illustrating example operations of the system of FIG. 1.

FIG. 3 is a graph illustrating an example execution of the data fusion engine 118 of FIG. 1. In the example of FIG. 3, fusion cycles 302 are illustrated on an X axis from 0 to 100 cycles. Meanwhile, a first Y axis illustrates a number of observation sets in the queue 124, where the first Y axis is labeled as axis 304 and corresponds to graph 304a. Meanwhile, the second Y axis is labeled as axis 306 and represents a fusion cycle processing time in milliseconds, and therefore corresponds to data graph 306a, as shown.

In the specific example of FIG. 3, it may be considered that the performance of the data fusion engine 118 is illustrated in an environment which at least temporarily experiences a high computational load, e.g., associated with a high density of targets. For the sake of the example, the size of the queue 124 may be set to hold up to 20 observation sets. Also for the sake of the example, a bypass enable threshold to be monitored by the load monitor 132 and associated with an indication of a presence of a high computational load environment is set at an approximate value of 15 observation sets within the queue 124, and is illustrated in the example of FIG. 3 as bypass enable threshold 308. Conversely, a bypass disable threshold 310 is illustrated at which the load monitor 132 is configured to inform the bypass manager 130 that a high computational load environment no longer exists. In the example of FIG. 3, as shown, the bypass disable threshold is set at approximately 6 observation sets.

Thus, the chart of FIG. 3 illustrates a number of observation sets in the queue 124 over a period of time, along with a corresponding fusion cycle processing time. As shown, FIG. 3 illustrates a strong correlation between a number of observation sets in the queue 124 and the fusion cycle processing time.

For example, as shown, beginning with initial fusion cycles, correlating operations of the correlation engine 126 may proceed, while a number of observation sets in the queue 124 gradually escalates, e.g., due to the above-referenced high target density of targets within the area 102. At approximately the $32^{nd}$ fusion cycle, as shown, the number of observation sets in the queue 124 meets the bypass enable threshold 308, at which time the fusion cycle processing time 306a is substantially reduced by the bypass operations of the bypass manager 130.

That is, at a time that the queue 124 meets the bypass enable threshold 308, the bypass manager 130 may enable bypassing of the gating module 136 and the association module 138, e.g., by relying on the observation IDs 142, whereupon computational resources required by the correlation engine 126 may be substantially reduced. Consequently, as shown, the data graph 304a representing the number of observation sets within the queue 124 gradually decreases, as the correlation engine 126 rapidly processes available observation sets from within the queue 124.

As shown, at approximately the $42^{nd}$ fusion cycle, the data graph 304a illustrates that the number of observation sets in the queue 124 reaches the bypass disable threshold 310, as detected by the load monitor 132, whereupon the bypass manager 130 may be instructed to end bypass operations. During subsequent fusion cycles, as shown, the resulting increase in computational resources required by the correlation engine 126 results in a continual increase in a number of observation sets within the queue 124, until the bypass enable threshold 308 is reached again at approximately the $61^{st}$ fusion cycle. Thereafter, as shown, the number of observation sets in the queue 304a may continue to be monitored by the load monitor 132, so that the bypass manager 130 may be executed whenever the bypass enable threshold 308 is exceeded (e.g., at the approximately $89^{th}$ fusion cycle), and instructed to cease bypass operations when the load monitor 132 detects that the number of observation sets in the queue 124 is at or below the bypass disable threshold 310 (e.g., at the approximately $70^{th}$ and $99^{th}$ fusion cycle).

Thus, as may be observed, each time the bypass manager 130 is enabled, the associated processing time immediately drops, which results in a decrease of observation sets within the queue 124. After the queue is sufficiently reduced, the bypass manager 130 is disabled and the queue 124 begins to fill again. In this way, the bypass manager 130 may be implemented on a moderate and/or intermittent basis, so that any accumulated target errors associated with reliance on use of the observation IDs 142 may be mitigated or minimized, and may be prevented from persisting or propagating over time.

In the example, bypassing the gating module 136 and the association module 138 may be observed to drop the processing time by more than half, which assists the correlation engine 126 in processing available observation data more quickly, and thereby in recovering from an existing overflow state. Moreover, in the example, the mean square error (MSE) of estimations of the targets may be observed to be approximately constant and reasonably low, thereby illustrating that inaccuracy of updates of the target 128 is not strongly affected by the moderate use of the bypass manager 130 as described herein.

Figure 4:
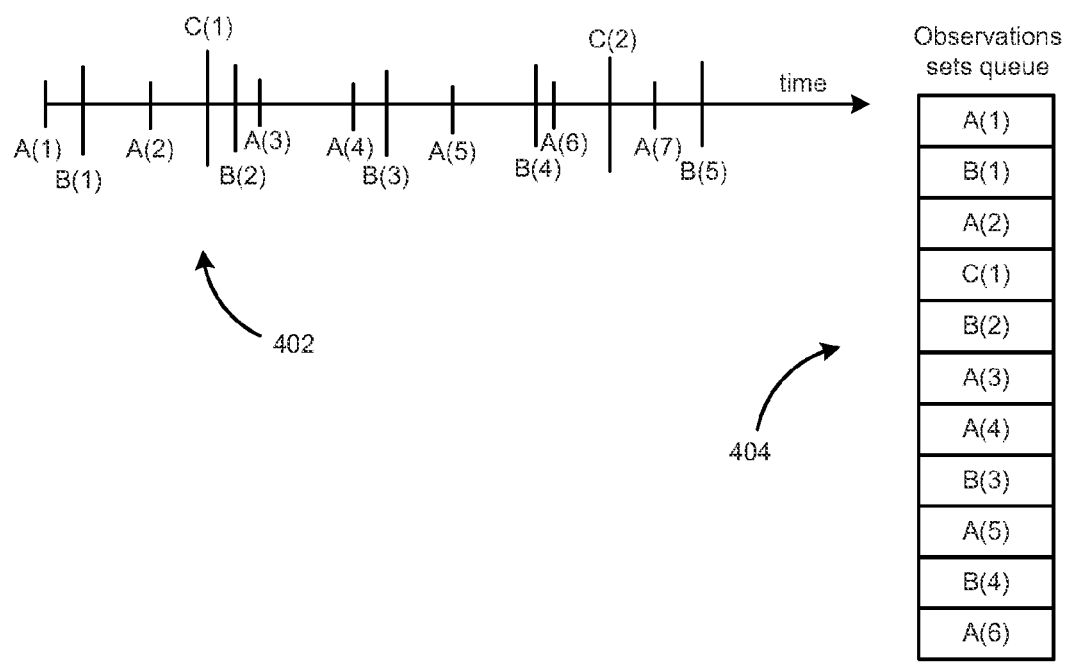
FIG. 4 is a timing diagram illustrating observation sets received and queued in the system of FIG. 1.

FIG. 4 illustrates observation sets received from three unsynchronized sensors, such as the sensors 104a-104c. In the example, as described above, each such sensor may report in a different frequency, i.e., may be unsynchronized. In the example, X(i) may be observed to denote an i'th observation set received from sensor X. For example, A(1)-A(6) represent observations received from the sensor 104a, while observations B(1)-B(4) represent observation sets received from the sensor 104b, and observation C(1) represents an observation received from the sensor 104c. As described above, the resulting observation sets may be stored in the queue 124 and processed by the correlation engine 126 in a first-in first-out (FIFO) manner.

Figure 5A:
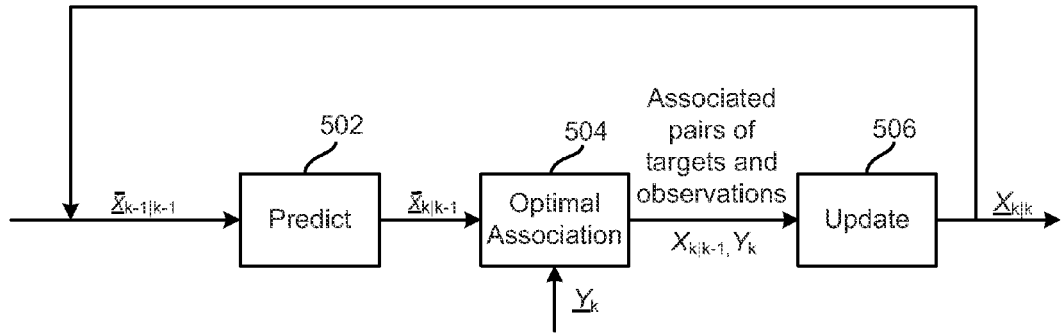
FIG. 5A is a block diagram illustrating a multi-target estimation process.

FIG. 5A is a block diagram illustrating example correlating operations that may be theoretically executed by the correlation engine 126. That is, as described below, FIG. 5A illustrates an ideal or theoretical scenario in which the correlation engine 126 is optimally aware of individual associations between observations and targets. Of course, in more practical example scenarios, such as explained above and illustrated and described below with respect to FIG. 5B, such optimal associations are not available, so that it may be appreciated that the example of FIG. 5A is provided for conceptually illustrating the basis for a multi-target estimation process underlying the more specific, practical example of FIG. 5B.

Specifically, the example of FIG. 5A is based on use of the Kalman filter, which, by focusing on the mean square error (MSE) and under the constraint of a discrete-time linear estimator, provides an efficient, recursive, real-time optimal solution which may be used for estimating a single target's kinematic information (e.g., position, velocity, acceleration, and so on) from a noisy set of observations. Specifically, as is known, the Kalman filter may be utilized to minimize the MSE, and is known to converge to the non-linear optimal solution if the noise is known to be normally distributed. Thus, in the example of FIG. 5A, under this given model and as referenced above, by assuming for the sake of the example that the optimal association 504 is available between each target and its observation, multiple targets tracked through independent Kalman filters will independently minimize each estimated target's MSE.

As described above, the processing time of each fusion cycle processed by the correlation engine 126 may vary, and may be affected by a plurality of factors. The operational environment, e.g., the area 102, may strongly affect a complexity and hence a processing time associated with both the gating module 136/508 and/or the association module 130/510 (as related to target density, target speed, and various other target-related factors, among other factors). Moreover, limitations or demands on available computational resources may exist independently of the sensors 104a-104c, the targets 106, 108, or the area 102. For example, the at least one computing device 144 of FIG. 1 may utilize a plurality of processors 144a, and it may occur that parallel threads running in such contexts may consume available CPU resources, which may or may not be related to functionalities of the data fusion engine 118 or the kinematic data analyzer 120.

Thus, FIG. 5A may be understood to represent a technique for identifying an optimal solution for the multi-target tracking (MTT) problem, based on the structure of the Kalman filter. Specifically, in the example of FIG. 5A, $X_k$ may be understood to represent the target, e.g., one of the targets 106, 108. Specifically, $X_k$ represents the targets state vector (position and velocity). Somewhat similarly, $Y_k$ represents the observation vector at time k, while $\hat{X}_{k|k-1}$ represents a target estimate at time k, given observations up to and including time k−1.

Thus, as illustrated in the example of FIG. 5A, an initial estimate at a time k−1, based on observations up to and including the time k−1, may be represented as the estimate $\hat{X}_{k-1|k-1}$ which may be used to predict 502 an estimate of a subsequent target position at time k, given observations up to and including time k−1. In other words, for example, with respect to the specific example of FIG. 1, the prediction 502 may begin with a target state vector associated with the target 106 at the position 110, represented in the example of FIG. 5A by the vector $\hat{X}_{k-1|k-1}$. Thereafter, the prediction 502 may predict the resulting target state vector at time k as the vector $\hat{X}_{k|k-1}$, e.g., may predict that the target 106 will be at the position 112 at time k, based on a knowledge of the state vector associated with the target 106 up to and including its position at the position 110 at the time k−1.

Then, if one or more observation vectors $Y_k$ are received from the sensors 104a-104c and are optimally known to be associated with the target 106, then associated pairs of targets and observations ($\hat{X}_{k|k-1}, Y_k$) may be utilized to update 506 the target data 128. Such data updates are represented in FIG. 5A as the target state vector $\hat{X}_{k|k}$. That is, the updated target data may be understood to represent the target state vector at the current time, which may thereafter be iteratively provided for a subsequent prediction 502, i.e., may thus represent a new target state vector $\hat{X}_{k-1|k-1}$ with respect to a future moment in time and associated target positions to be predicted.

As described above, FIG. 5B represents a more practical implementation of the example of FIG. 5A in the context of FIG. 1. As shown, gating function 508 and associated function 510 may be understood to provide a real-world example of the optimal association 504 of FIG. 5A. As described above with respect to FIG. 1, observation vectors $Y_k$ may be received from queue 512 representing the queue 124 of FIG. 1, as received from sensors 514-518, as shown.

Figure 5B:
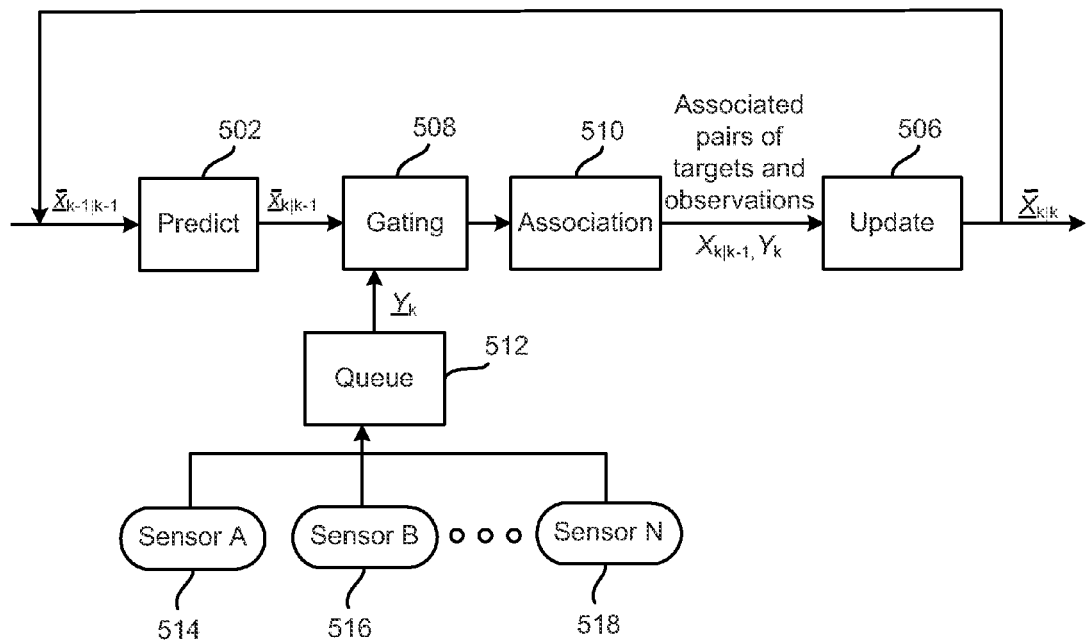
FIG. 5B is a block diagram illustrating the multi-target estimation process of FIG. 5A in the system of FIG. 1.

Thus, in the example of FIG. 5B, gating 508 may be performed with respect to received estimated target state vectors $\hat{X}_{k|k-1}$ predicted by the prediction block 502 as described above. Then, as described above with respect to the gating module 136, the gating function 508 may be executed as a pre-processing module which relies on a predefined gating threshold distance. In practice, it may be appreciated that the gating threshold may be relatively reduced (e.g., a relatively smaller distance may be used), at a potential cost of loss of accuracy in updating the target data 128, or may be relatively increased (e.g., a relatively larger distance may be used) in order to minimize or eliminate such losses of accuracy, although at the cost of relative increases in computational resources required by the correlation engine 126.

In other words, for example, if the distance threshold used by the gating module 136 with respect to each received observation and associated potential target(s) is very small, then an amount of work required to be done by the association module 138 may be substantially reduced, since the association module 138 will only need to consider a relatively small number of potential targets for association with a given observation or observation set. Conversely, increasing the distance threshold used by the gating module 508/136 may result in the encompassing of a relatively larger number of targets which may potentially be updated by a given observation or observation set, so that the association module 138/510 is required to consider a large number of possible targets for updating. The association 510 may thus be understood to receive the gated predicted target vector $\hat{X}_{k|k-1}$, as well as the gated observation vector $Y_k$, so as to thereby generate pairs of predicted targets and corresponding observations ($\hat{X}_{k|k-1}, Y_k$).

As referenced above, the associating may be calculated such that a quoted price of association is minimized, where the price may be defined as a distance measure between a predicted target and its associated observation. Such two dimensional association is a well-studied problem in the field of optimization theory, and may be solved using a number of known techniques, e.g., the generalized auction algorithm, a network flow algorithm in (pseudo) polynomial time, among others.

In this way, as shown and described above with respect to FIG. 5A, the correlation engine 126 may proceed in an iterative fashion to continually update the target data 128 using the incoming observations $Y_k$.

Figure 6:
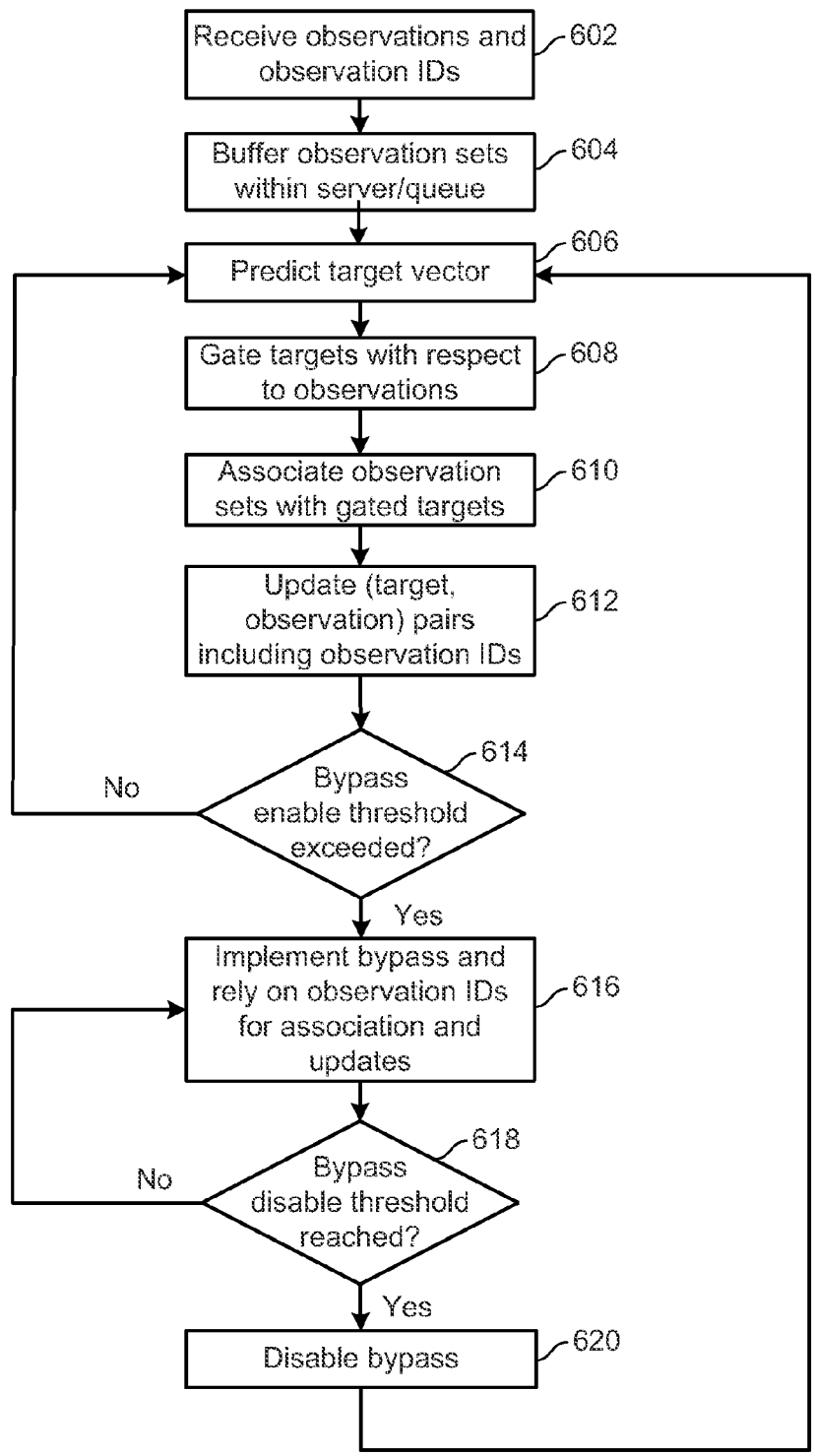
FIG. 6 is a flowchart illustrating more detailed example operations of the system of FIG. 1 in the example context of FIG. 5B.

FIG. 6 is a flowchart 600 illustrating more detailed example operations of the system 100 of FIG. 1, in the examples of FIGS. 3-5B. In the example of FIG. 6, observations and associated observation IDs 142 may be received by the input handler 122 from the sensors 104a-104c (602). The received observation sets may be buffered within the queue 124 (604).

The correlation engine 126 may then proceed with utilizing the prediction module 134 to predict a target vector for each known target (606). The gating module 156 may gate potential targets with respect to received observations from the queue 124 (608).

Subsequently, the association module 138 may associate observation sets with corresponding, gated targets (610). In this way, target observation pairs may be updated within the target data 128, including observation IDs associated with the corresponding observations (612). That is, in the example, the target data 128 may include the target/observation pairs stored in conjunction with observation IDs 142 received from the tracking modules 141a-141c, so that the observation IDs 142 maybe utilized during bypass operations initiated by the bypass manager 130, as described herein.

If a bypass enable threshold defined with respect to the queue 124 is not exceeded (614), then operations 606-612 may proceed. That is, as long as the queue 124 is not in danger of experiencing overflow, as detected by the load monitor 132, the correlation engine 126 may continue normal operations defined with respect to expected/acceptable computational loads.

If, however, the bypass enable threshold is exceeded (614), then the load monitor 132 may notify the bypass manager 130, whereupon the bypass manager 130 may initiate bypass operations, including relying on appropriate ones of the observation IDs 142 for associating incoming observation sets with targets and thereby updating the target data 128 accordingly (616). As long as the bypass disable threshold is not reached (618), the bypass manager 130 may continue to instruct the correlation engine 126 to continue correlating operations including bypassing the gating module 136 and the association module 138 while relying on the stored observation IDs to update the target data 128.

However, once the queue 124 has its content reduced to a sufficient extent that the bypass disable threshold is reached (618), as detected by the load monitor 132, then the bypass manager 130 may be instructed to disable the bypass operations (620). In such cases, operation 606-612 associated with normal operations of the correlation engine 126 when not in the presence of high load environment may continue.

Although the above description has provided specific examples, it will be appreciated that such examples are non-limiting, and that other examples may be implemented. For example, in some implementations, the bypass enable/disable thresholds (e.g., 308, 310 in FIG. 3) and the associated bypass operations may be implemented in a manner that is more continuous than that described above with respect to the individual thresholds 308, 310. In other words, for example, a plurality of bypass enable thresholds may be set, and fusion cycle processing times may be adjusted based on a threshold level (of a plurality of threshold levels) that has been reached. Many other example embodiments may be implemented, as well.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer system including instructions recorded on a computer-readable medium and executable by at least one processor, the system comprising:
   an input handler configured to cause the at least one processor to receive a plurality of observations from a plurality of sensors, the plurality of observations corresponding to a plurality of targets observed by the sensors;
   a correlation engine configured to cause the at least one processor to correlate, using a data fusion algorithm, observations of the plurality of observations with individual targets of the plurality of targets;
   a load monitor configured to cause the at least one processor to detect that a computational load associated with the correlating exceeds a threshold; and
   a bypass manager configured to cause the at least one processor to continue the correlating including bypassing at least a portion of the data fusion algorithm, in response to the detecting.

2. The system of claim 1, wherein the input handler is configured to store the observations in a queue.

3. The system of claim 2, wherein the threshold is defined with respect to a bypass enable threshold defined relative to a number of observations within the queue.

4. The system of claim 2, wherein the load monitor is configured to detect that the computational load is lower than a second threshold, the second threshold being defined with respect to a bypass disable threshold which is defined relative to a number of observations within the queue.

5. The system of claim 4, wherein the bypass manager is configured to discontinue the bypassing in response to a detection by the load monitor that a number of observations within the queue is below the bypass disable threshold.

6. The system of claim 1, wherein the plurality of targets demonstrate motion within or through an area monitored by the plurality of sensors.

7. The system of claim 1, wherein the correlation engine is configured to predict a future position of each of the plurality of targets, and to associate each received observation with a target at a predicted position.

8. The system of claim 7, wherein the correlation engine is configured to execute a gating module configured to at least partially implement the data fusion algorithm, including filtering predicted targets outside of a pre-defined distance from being matched with a corresponding observation.

9. The system of claim 8, wherein the bypassing including bypassing at least a portion of the gating module.

10. The system of claim 7, wherein the correlation engine is configured to execute an association module configured to associate each observation with at least one predicted target.

11. The system of claim 10 wherein the bypassing includes bypassing at least a portion of the association module.

12. The system of claim 10, wherein the correlation engine is configured, during the bypassing, to associate each received observation with a predicted target using an observation identifier (ID) provided by a tracking module of a sensor of the plurality of sensors which captured the corresponding observation.

13. A computer-implemented method, comprising:
   receiving a plurality of observations from a plurality of sensors, the plurality of observations corresponding to a plurality of targets observed by the sensors;
   correlating, using a data fusion algorithm executed by a computer, observations of the plurality of observations with individual targets of the plurality of targets;
   detecting that a computational load associated with the correlating exceeds a threshold; and
   continuing the correlating including bypassing at least a portion of the data fusion algorithm, in response to the detecting.

14. The method of claim 13, wherein the receiving the plurality of observations includes storing the observations in a queue, and wherein the threshold is defined with respect to a number of observations stored in the queue.

15. The method of claim 13, comprising:
   determining that the computational load is lower than a second threshold; and
   discontinuing the bypassing, based on the determining.

16. The method of claim 13, wherein the continuing the correlating includes associating each received observation with a predicted target using an observation identifier (ID) provided by a tracking module of a sensor of the plurality of sensors which captured the corresponding observation.

17. A computer program product, the computer program product being tangibly embodied on a computer-readable medium and comprising instructions that, when executed, are configured to:
   receive a plurality of observations from a plurality of sensors, the plurality of observations corresponding to a plurality of targets observed by the sensors;
   correlate, using a data fusion algorithm, observations of the plurality of observations with individual targets of the plurality of targets;
   detect that a computational load associated with the correlating exceeds a threshold; and
   continue the correlating including bypassing at least a portion of the data fusion algorithm, in response to the detecting.

18. The computer program product of claim 17, wherein the instructions, when executed, are further configured to:
   determine that the computational load is lower than a second threshold; and
   discontinue the bypassing, based on the determining.

19. The computer program product of claim 17, wherein the correlating includes predicting a future position of each of the plurality of targets, and associating each received observation with a target at a predicted position.

20. The computer program product of claim 17, wherein continuing the correlating includes associating each received observation with a predicted target using an observation identifier (ID) provided by a tracking module of a sensor of the plurality of sensors which captured the corresponding observation.

* * * * *